United States Patent
Takahashi et al.

(10) Patent No.: US 6,442,589 B1
(45) Date of Patent: Aug. 27, 2002

(54) METHOD AND SYSTEM FOR SORTING AND FORWARDING ELECTRONIC MESSAGES AND OTHER DATA

(75) Inventors: Tadashi Takahashi, Sunnyvale, CA (US); Takeshi Kumazawa, Tokyo (JP); Hirokatsu Araki, Cupertino, CA (US); Tsuyoshi Hirao, San Jose, CA (US); Hitoshi Matsumoto, Los Gatos, CA (US)

(73) Assignee: Fujitsu Limited (JP)

( * ) Notice: Subject to any disclaimer, the term of this patent is extended or adjusted under 35 U.S.C. 154(b) by 0 days.

(21) Appl. No.: 09/231,522

(22) Filed: Jan. 14, 1999

(51) Int. Cl.[7] ............................................. G06F 13/00
(52) U.S. Cl. ...................................................... 709/203
(58) Field of Search ................................. 709/200, 206, 709/207, 208, 213, 227, 230, 236, 246, 203

(56) References Cited

U.S. PATENT DOCUMENTS

| | | | |
|---|---|---|---|
| 5,257,349 A | 10/1993 | Alexander | 395/159 |
| 5,339,392 A | 8/1994 | Risberg et al. | 395/161 |
| 5,377,354 A | 12/1994 | Scannell et al. | 395/650 |
| 5,446,891 A | 8/1995 | Kaplan et al. | 395/600 |
| 5,471,610 A | 11/1995 | Kawaguchi et al. | 395/600 |
| 5,473,777 A | 12/1995 | Moeller et al. | 395/700 |
| 5,475,845 A | 12/1995 | Orton et al. | 395/700 |
| 5,583,655 A | 12/1996 | Tsukamoto et al. | 358/400 |
| 5,608,874 A | 3/1997 | Ogawa et al. | 395/200.15 |
| 5,613,108 A | 3/1997 | Morikawa | 393/616 |
| 5,617,526 A | 4/1997 | Oran et al. | 395/326 |
| 5,619,648 A | 4/1997 | Canale et al. | 395/200.01 |
| 5,634,005 A | 5/1997 | Matsuo | 395/200.02 |
| 5,649,186 A | 7/1997 | Ferguson | 395/610 |
| 5,724,567 A | 3/1998 | Rose et al. | 395/602 |
| 5,724,597 A | 3/1998 | Cuthbertson et al. | 395/793 |
| 5,734,903 A | 3/1998 | Saulpaugh et al. | 395/683 |
| 5,761,656 A | 6/1998 | Ben-Shachar | 707/4 |
| 5,761,662 A | 6/1998 | Dasan | 707/10 |
| 5,781,904 A | 7/1998 | Oren et al. | 707/100 |
| 5,801,700 A | 9/1998 | Ferguson | 345/349 |
| 5,802,253 A | 9/1998 | Gross et al. | 395/51 |
| 5,806,079 A | 9/1998 | Rivette et al. | 707/512 |
| 5,809,318 A | 9/1998 | Rivette et al. | 395/773 |
| 6,073,165 A * | 1/2000 | Narasimhan et al. | 709/206 |
| 6,202,086 B1 * | 3/2001 | Maruyama et al. | 709/206 |

* cited by examiner

*Primary Examiner*—Robert B. Harrell
(74) *Attorney, Agent, or Firm*—Coudert Brothers LLP

(57) ABSTRACT

An electronic message forwarding system selectively forwards information to a plurality of different receiving device types. One or more user defined filters filter incoming messages, route the messages, and send the routed message to appropriate form converters to convert the message into a form appropriate to the receiving device type, such as e-mail, pager, facsimile, or telephone forwarding. In a preferred embodiment, a plurality of filters, router, and form converters may be used to perform a message classification, channel selection, and channel output control function.

22 Claims, 11 Drawing Sheets

FUJITSU REPORTS FY98 HALF-YEAR FINANCIAL RESULTS
- CONSOLIDATED SALES GAIN, PROFITS DOWN -

SUMMARY OF CONSOLIDATED RESULTS
SUMMARY OF UNCONSOLIDATED RESULTS
PROJECTIONS FOR FY1998
FUJITSU REPORTS FY98 HALF-YEAR FINANCIAL RESULTS... (TEXT)
CONSOLIDATED NET SALES BY PRODUCT AREA
CONSOLIDATED STATEMENTS OF INCOME
CONSOLIDATED BALANCE SHEETS
UNCONSOLIDATED NET SALES BY PRODUCT AREA
UNCONSOLIDATED STATEMENTS OF INCOME
UNCONSOLIDATED BALANCE SHEETS
SUPPLEMENTARY FIGURES

SUMMARY OF CONSOLIDATED RESULTS

|  | YEN (MILLIONS) | | | YEN (MILLIONS) | U.S. DOLLARS (MILLIONS) |
|---|---|---|---|---|---|
|  | 1ST HALF FY 1998 | 1ST HALF FY 1997 | CHANGE (%) | FY 1997 | 1ST HALF FY 1998 |
| NET SALES | Y2,413,301 | Y2,262,718 | +7 | Y4,985,382 | $17,876 |
| OPERATING INCOME | 44,151 | 103,615 | -57 | 177,353 | 327 |
| INCOME BEFORE INCOME TAXES | 41,502 | 63,149 | -34 | 123,855 | 307 |
| NET INCOME | 8,367 | 15,350 | -45 | 5,587 | 62 |

AMOUNTS PER SHARE OF COMMON STOCK:

| | | | | | |
|---|---|---|---|---|---|
| BASIC EARNINGS | Y4.5 | Y8.3 | | Y3.0 | $0.033 |
| CASH DIVIDENDS | Y5.0 | Y5.0 | | Y10.0 | $0.037 |

COMMON STOCK ISSUED:
1998/9/30   1,874,959 THOUSAND SHARES
1997/9/30   1,860,609 THOUSAND SHARES
1998/3/31   1,862,356 THOUSAND SHARES

FIG. 1

METHOD AND SYSTEM FOR SORTING AND FORWARDING ELECTRONIC MESSAGES AND OTHER DATA

FIELD OF THE INVENTION

The present invention relates to electronic messaging in general and to the selective sorting and forwarding of electronic mail and other data.

BACKGROUND OF THE INVENTION

Many computer users face the problem of receiving numerous electronic mail (e-mail) messages each day. These electronic messages may be sent by co-workers, such as on networked computer systems used in business, government, and many universities. Additionally, computer users may also receive messages via the internet from friends, colleagues, or clients. It is not uncommon for many computer users to receive twenty-to-thirty e-mail messages each day.

Some computer users also face the additional problem that they may receive numerous electronic messages containing information acquired from the world wide web. There are a variety of programming methods that facilitate a transfer of information from the world wide web to a user's computer in the form of an electronic message. For example, U.S. Pat. No. 5,649,186 discloses a system and method for providing a dynamic clipping service in which the user creates a template of topics of interest that are transmitted to a central site for processing in order to acquire articles of interest to the user from the world wide web. Similarly, U.S. Pat. No. 5,761,662 discloses a personalized information retrieval system for retrieving information from web sites based upon a user-defined profile. Consequently, computer users may regularly receive numerous electronic messages from dynamic clipping services or commercial information providers.

Both the quantity and quality of information available from the world wide web is steadily increasing. Many corporations have web sites that contain information useful to financial analysts. For example, as shown in FIG. 1, one of the numerous web-sites of Fujitsu, Ltd., contains information on the financial performance of Fujitsu, Ltd. Other Fujitsu web-sites contain information on new Fujitsu products and services. There are an increasing number of web-sites for both private corporations and government agencies that provide many types of data. For example, there are numerous web-sites devoted to financial information and the analysis of various stocks. There are also numerous news sites, many of which include transcripts of news stories. From such web-sites, information on the Dow Jones industrial average and news stories on the performance of individual companies can be obtained. Some of these web-sites are updated only once a day. However, many financial web-sites and news web-sites are updated several times per day. Thus, while a custom newspaper (e.g., a collection of articles in areas of interest to the user) may be acquired only once a day, it may also be acquired much more frequently (e.g., several times per day) to satisfy the demands of users who require continual updating of volatile information, such as financial information.

The electronic "in-box" of many computer users may be filled each day with dozens of e-mail messages and/or documents acquired from the world wide web. It can be time consuming to sort through a plurality of incoming e-mail messages and web documents each day. Application programs to filter out so-called "junk e-mail" can help, somewhat, to reduce this burden. For example, U.S. Pat. No. 5,377,354 discloses a method for sorting and prioritizing e-mail messages based upon a rules-test unit incorporating user defined rules. Similarly, systems to sort incoming electronic mail, such as sorting incoming e-mail documents into different folders based upon characteristics of the message, are disclosed in U.S. Pat. No. 5,613,108.

A major shortcoming of conventional electronic mail systems is that they do not adequately address the problems that users have when sickness, business travel, or personal vacations requires them to be away from their computer. For example, a computer user who receives, on average, twenty e-mail messages a day may return from a two-week vacation with two-hundred e-mail messages in her e-mail mailbox. If any of the messages are time-sensitive, the results can be catastrophic. For example, an investment banker receiving an e-mail message from a colleague that: "ACME, Inc.'s new products are selling well in the Atlanta test-market" may want to be informed immediately in regards to making decisions about providing venture financing for the expansion of ACME, Inc. Similarly, a stock broker who regularly receives news from an electronic clipping service may want to be immediately alerted if, for example, the clipping service acquires a news article, "ACME, Inc., revealed today the successful test-marketing of a new product in Atlanta and announced that it had obtained financing to expand its production in anticipation of nationwide distribution."

Many of the same problems apply during evenings and weekends. The stock broker away for a weekend skiing may want to know, well ahead of the opening of the New York Stock Exchange on Monday, the contents of urgent e-mail messages warning of financial unrest in overseas markets. Similarly, a corporate manager may want to know the contents of urgent e-mail messages received during evening hours, such as e-mail messages or web-documents describing an upcoming labor strike.

Computer users who are concerned that they may not receive time-sensitive e-mail messages or web documents while they are away form the office have few options. They can, of course, bring portable computers and modems with them in order to access their computer via a phone-link while they are away from their main computer. However, many portable computers are comparatively bulky. Even a notebook computer that weighs two pounds may be inconvenient to bring along while on vacation. Additionally, a portable computer can be expensive, and is also relatively fragile.

Another drawback of bringing a portable computer to access accumulated electronic messages is that the user must remember to periodically link their computer via a phone connection. Moreover, some types of information, such as stock prices, are so volatile that it may be impractical for a user away from their office to examine their electronic in-box frequently enough to be of much use. For example, a stock broker taking a day-off may find it burdensome to bring their portable computer and to make a phone-link on a frequent enough basis (e.g., every hour) in order to track the progress of a volatile stock that she wishes to sell.

Unfortunately, conventional methods to manage incoming e-mail messages and web-documents do not address the needs of computer users who are away from their computers yet may receive time-sensitive materials. Although this is an especially severe problem for computer users who are away on extended business trips or vacation, it can also be a problem for users who are away from their computer for much shorter periods, such as during evenings and weekends. Moreover, this problem will become worse as more business interactions are conducted by electronic mail and with businesses located in different time zones. Additionally, the increasing quantity of information available from the world wide web coupled with custom news clipping applications will soon permit users to receive the equivalent of dozens of customized newspapers each day from the world wide web. Although existing electronic message handling systems may be programmed to automatically forward all electronic messages to other e-mail addresses, computer users do not have the ability to selectively forward electronic messages in flexible, convenient ways that will significantly increase their productivity or increase the enjoyment of their leisure time.

What is desired is an electronic message management system and method to automatically sort and forward incoming electronic messages and documents.

SUMMARY OF THE INVENTION

The present invention generally addresses the problem of sorting and forwarding electronic messages and other data, such as e-mail messages, sent between computer users. The information forwarding system of the present invention automatically forwards electronic messages to e-mail address destinations and non e-mail destinations. The inventive system includes a filter that may be programmed using user-defined criteria to select messages to be forwarded; a router that may be programmed with forwarding information; and a form converter to convert filtered messages that are routed to the converter into a form suitable for the receiving device to which the data is forwarded. A plurality of filters, routers, and form converters may preferably be used together to perform a classification, channel selection, and a channel output control function. In a preferred embodiment, documents acquired by a programmable information collector from a world wide web or local server may also be forwarded.

One object of the present invention is realized by a message forwarding system that permits a user to forward filtered messages to a variety of different reception devices, such as e-mail, phone, facsimile, and pager receiving devices.

Another object of the present invention is realized by a message forwarding system that permits a user to select a plurality of filtering and routing criteria to perform a classification function whereby different types of messages are forwarded to different receiving nodes.

Still another object of the present invention is realized by a message forwarding system designed to work together with a programmable message collector to forward documents acquired from the world wide web or a local server.

BRIEF DESCRIPTION OF THE DRAWINGS

FIG. 1 is a copy of corporate web-site containing information that may be acquired using an information clipping program.

DETAILED DESCRIPTION OF THE INVENTION

Figure 2:
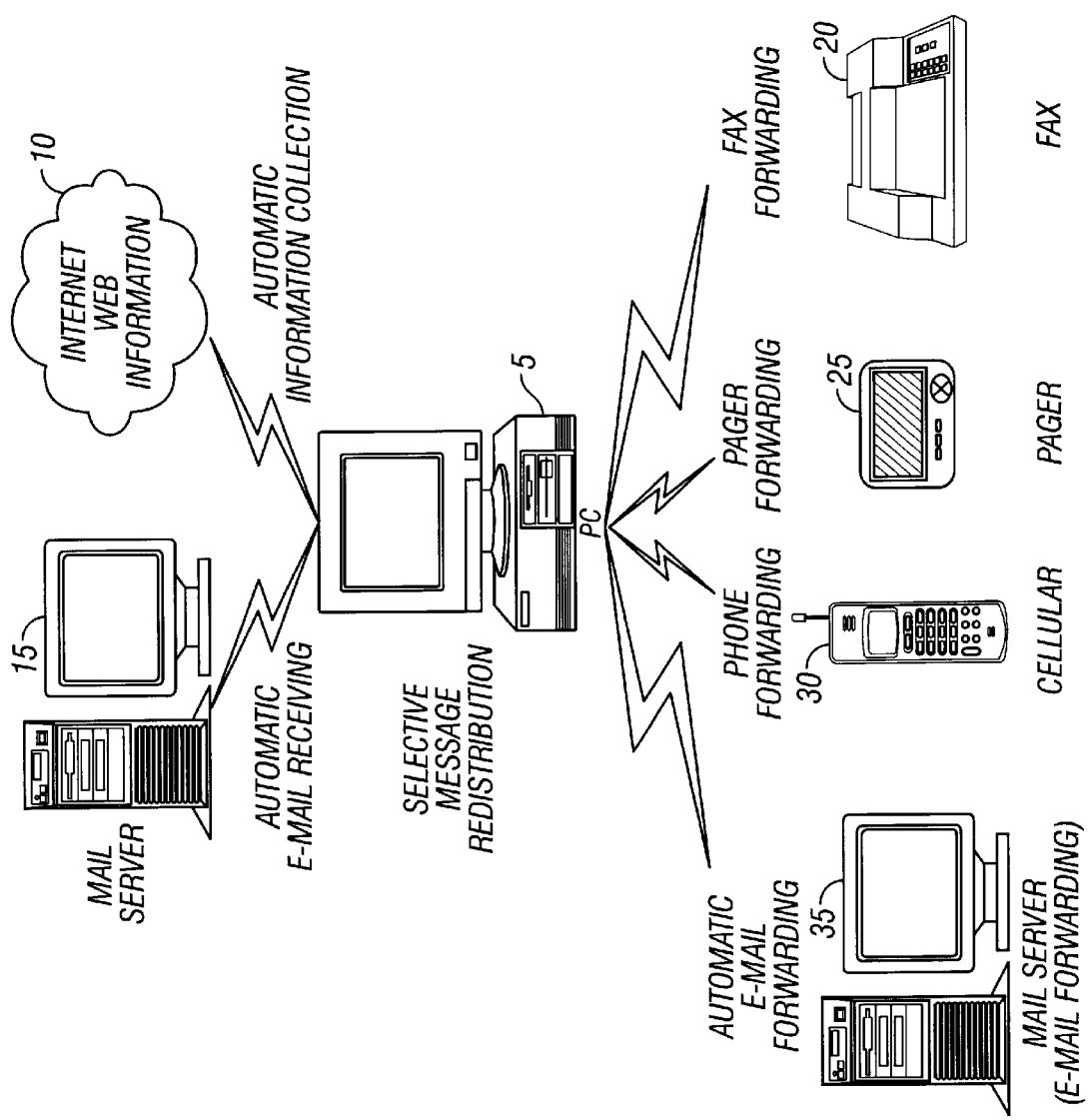
FIG. 2 is an illustrative diagram showing primary components of the message forwarding system of the present invention.

The present invention generally comprises a system and method to sort and forward high priority e-mail messages and incoming information acquired from other sources, such as news clipping applications, to a desired location. The general objectives of the present invention are realized by the system illustrated in FIG. 2. A computer 5 receives electronic e-mail from a mail server 15. Additionally, information may be acquired as electronic messages from other sources 10, such as by a dynamic news clipping application that acquires articles of interest from the world wide web. The present invention is directed towards automatically forwarding electronic messages or incoming web articles. For example, when the user is out of the office they may desire to forward incoming messages to themselves or to others as conventional e-mail through a mail server 35. However, the inventors have recognized that users may also wish to have the text of messages forwarded to other destinations. For example, users may also desire to have the text of messages forwarded in an appropriate form to a facsimile (FAX) machine 20, a pager 25, or to a cellular phone 30.

The present invention may be practiced with conventional electronic mail systems and with conventional news clipping applications. However, the present invention is preferably practiced with the BEHALF application program of Fujitsu, Ltd. As used in this application, BEHALF is the internal development name for a message handling and message assistant application program of Fujitsu, Ltd. for use in personal computers utilizing a standard Windows applied programming interface. The BEHALF application includes information assistants that perform a news clipping function. In particular, the BEHALF application permits a user to program a schedule of times during which the personal assistants of the BEHALF application access preselected web-sites. The BEHALF application permits a user to specify that certain web-sites are to be searched for articles of interest on a daily or even hourly basis. Moreover, the BEHALF application permits the user to insert a list of keywords for the search. For example, using the BEHALF program, a user may program a personal computer to access the web-sites of newspapers such as the *New York Times*, the *Wall Street Journal*, the *London Times*, or to access corporate web-sites for articles of interest. For example, a stock broker using the BEHALF application can insert keywords related to ACME Widget, Inc., and automatically have the BEHALF application search for articles related to ACME Widget, Inc., from a plurality of web-sources on a pre-scheduled basis. Typically, most users desire daily updates, in analogy to conventional newspapers. However, the BEHALF application also permits more frequent updates. For example, a stock broker may program the BEHALF application to search out new information on ACME Widget, Inc., several times during one day.

The BEHALF application is also a preferred application because it has features that improve the quality of information acquired by news clipping applications. As described in the co-pending U.S. Patent application entitled "System And Method For Searching And Ranking Documents Using A Conceptual Thesaurus," attorney docket number 6529/53755, filed the same day as with the present application and the contents of which is hereby incorporated by reference, the BEHALF application includes a customizable thesaurus that permits a user to adjust the relative weighting of words used in a tree search method to find articles of interest. This may permit, for example, a stock broker to customize her keyword searching to improve the quality of information obtained by a news clipping application. The BEHALF application is also a preferred application because it has an automatic archiving function. Incoming e-mail messages and web documents acquired from personal assistants are automatically stored in a common window. This permits, for example, e-mail messages and incoming web documents to be archived for a period of time that may be defined by the user (e.g., one month).

Figure 3:
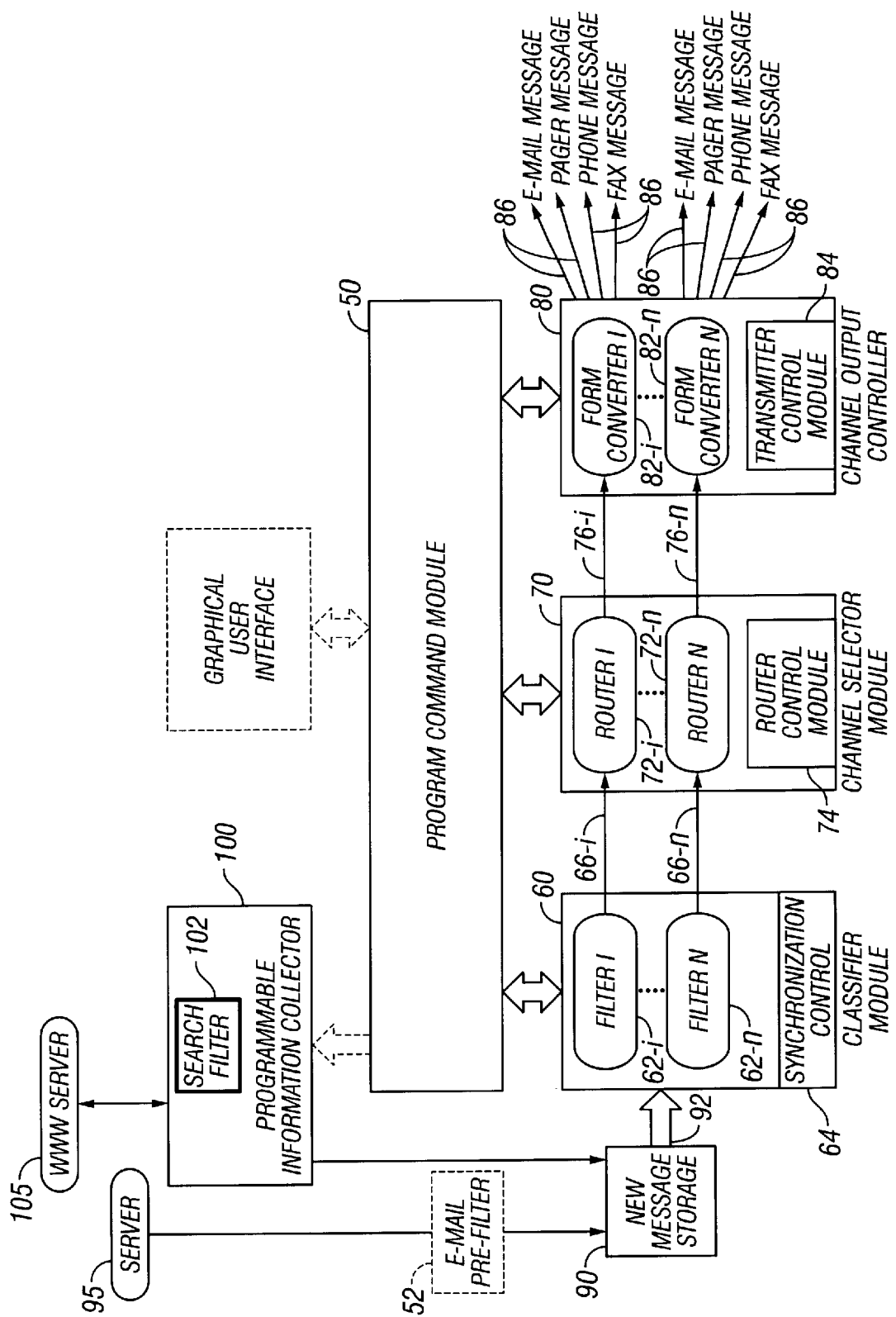
FIG. 3 is a block schematic diagram of the message forwarding system of FIG. 2.

FIG. 3 is a schematic block diagram of the message forwarding system of the present invention. A program control module 50 controls the activities of a classifier module 60, a channel selector module 70, and a channel output controller 80. As indicated in FIG. 3, electronic e-mail messages from a server 95 are received into a new message storage module 90. There may be a pre- filter 52, such as a so-called "junk-mail" filter to reduce the number of e-mail messages that are later processed. The present invention is also preferably used with a programmable information collector 100. The programmable information collector may be a conventional news clipping application for searching the world wide web 105. However, preferably the programmable information collector comprises one of the information assistants of the BEHALF application of Fujitsu, Ltd. The information collector 100 preferably has a search filter 102 that utilizes keyword(s) and/or other search criteria to search one or more user-selected web-sites. Preferably the user may program the times at which programmable information collector 100 searches for information. As indicated in FIG. 3, information acquired by programmable information collector 100 is stored in the message document storage module 90.

Although information collected in message document storage module 90 may be continuously sent to classifier module 60, preferably the user may select the frequency at which messages are forwarded. For example, in some cases the user may only desire that incoming messages are forwarded on an hourly basis, and in other cases, the user may desire that messages are forwarded once a day. Generally, it is preferable that there is storage module 90 or storage means for storing incoming messages for a brief period of time in case the messages are not immediately forwarded.

As indicated by arrow 92 in FIG. 3, new messages are forwarded to classifier module 60. Classifier module 60 preferably comprises at least one filter 62. Preferably, the user may program a plurality of filters. Each filter 62 has a corresponding filter criteria that permits the filter 62 to select incoming messages 92 for forwarding to channel selector module 70, as indicated by arrows 66. Classifier module 60 preferably also has a synchronization control element 64 to eliminate duplicate messages from being forwarded to channel selector module 70. Channel selector module 70 is preferably comprised of one router 72 for each corresponding filter 62 in classifier module 60. The output of each filter, as indicated by arrows 66 enters a corresponding router. Channel selector module 70 preferably also has a router control module 74 to coordinate the actions of the routers 72. As indicated by arrows 76, the output of the router links routed messages from channel selector 70 to form converters 82 in channel output controller 80. Channel output controller 80 is comprised of a plurality of form converters 82, where each individual form converter 82 is linked by a single router to the output of only one filter. Form converter 82 converts filtered messages into forms suitable for the receiving device types to which the message is being forwarded. Additionally, channel output controller 80 preferably contains a transmitter control module 84 to transmit converted messages. As indicated by arrows 86, redistributed messages may be sent to different device types in a form proper for the receiving device type.

Figure 4:
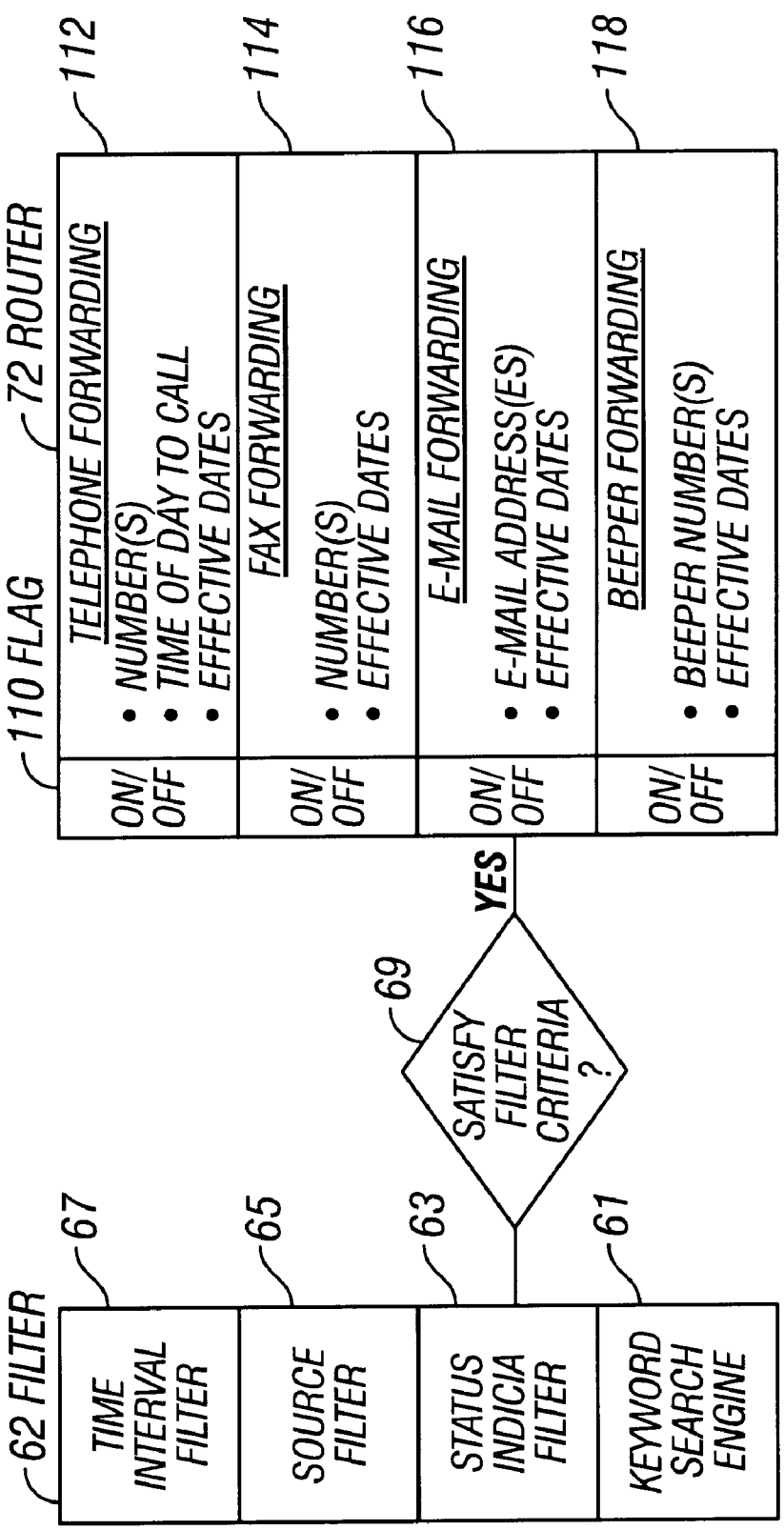
FIG. 4 is a block schematic diagram showing the operation of one filter and one router of FIG. 3.

FIG. 4 is a block diagram that shows how an individual filter 62 selects filtered information to an individual router 72. A single filter may comprise one or more selection criteria or selection means. That is, it may comprise sub-filters 61, 63, 65 and 67. In one embodiment, the filtered message must satisfy the combined filter criteria. For example, filter 62 may examine the source of the message (e.g., the address of the sender or the uniform resource locator address for a web document acquired by a news clipping program) using a source filter 65. A sub-filter related to status indicia 63 may filter the message depending upon its status, e.g., filtering messages that have been given an "urgent" priority status. There may also be a time interval filter 67 to select the period of time for which the filter selects messages. The filter 62 may examine portions of an e-mail header to examine keywords using a keyword search engine filter 61. Any type of keyword search, such as conventional string comparison keyword searches may be used. Tree search techniques, such as that described in co-pending application "System And Method For Searching And Ranking Documents Using A Conceptual Thesaurus," may also be used. Generally, any filter method to sort messages may be used in filter 62. For example, filters based upon a user-profile may also be used. The filter may also use other forms of boolean logic besides an "and" function, such as an "or" function in which the message is forwarded if it satisfies any one of several conditions. If the message/document satisfies the criteria of filter 62, it is forwarded 69 to a corresponding router 72.

As shown in FIG. 4, an individual router 72 of channel selector module 70 preferably includes flags 110 to activate corresponding sub-routers 112, 114, 116 and 118 corresponding to different forwarding device types. For example, a telephone sub-router 112 may include information on the number(s) to which the message is to be forwarded, acceptable times of day to call, and effective dates for which messages are to be forwarded via phone. Similarly, a facsimile sub-router 114 may include information on facsimile phone number(s) to which the message is to be forwarded, along with effective dates and/or times for the messages to be forwarded. An e-mail sub-router 116 preferably includes information on the e-mail address(es) to which messages are to be forwarded along with information on the effective dates for which messages are to be forwarded. It may also contain other information, such as the priority to be given to the forwarded e-mail address. For example, it may be desirable, in some cases, to redistribute electronic messages related to an important project as urgent e-mail, even if the source message is labeled as having a normal status. Finally, a pager sub-router 118 includes the pager telephone number (s) to which the information is to be forwarded along with effective dates and/or times of day during which messages are to be forwarded by pager. However, since the personal communications field is continually expanding with new products, an individual sub-router may comprise any personal communication device capable of receiving data sent over a suitable interconnection.

The router 72 provides a link between flagged sub-routers 112, 114, 116 and 118 and an appropriate information form converter 82 in channel output controller 80. Information form converter 82 performs the function of converting filtered messages 76 routed by the subrouters 112, 114, 116 and 118 of a router 72 into a form suitable for transmission to a specified receiving node. An information form converter 82 may be implemented in different ways. However, one way that an information form converter 82 may be implemented to perform a conversion function is for it to utilize a pointer table or other index method to link filtered messages from the subrouters 112, 114, 116 and 118 to appropriate information form conversion program modules. For example, there could be a common FAX form conversion module, a common pager form conversion module, and a common phone voicemail form conversion module to which the routed messages are linked by a pointer table in information form converter 82.

Figure 5:
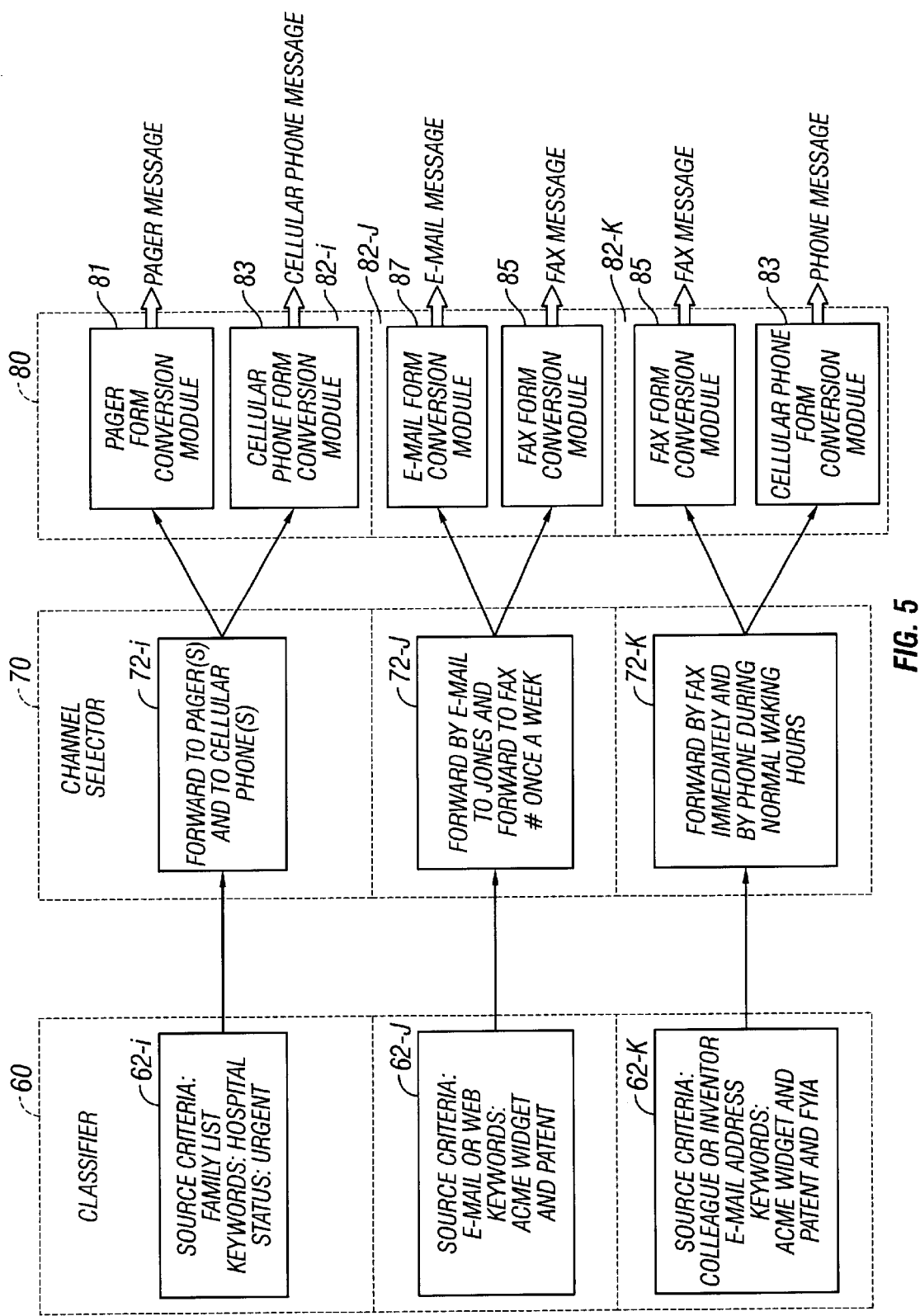
FIG. 5 is an illustrative block diagram showing different filter, router, and form converter criteria for the message forwarding system of FIG. 3.

FIG. 5 is an illustrative example showing how the message forwarding filters and routers may be programmed to achieve different message redistribution objectives. It is desirable to be able to program the filters and routers to achieve different message redistribution objectives. In particular, users often have different objective in regards to redistributing personal messages, routine business messages, and high priority business messages. For example, a user may desire to forward messages to themselves regarding urgent personal matters while they are away from their computer. As shown in FIG. 5, a user may program a filter 62-*i* to filter important family- related messages. As indicated in FIG. 5, a filter could be programmed to accept only urgent messages from close family members that contain the keyword "hospital. A corresponding router 72-*i* is preferably programmed to immediately forward such urgent personal messages to the user. For example, the messages may be sent to a beeper and/or a cellular phone using beeper form conversion module 81 and cellular phone conversion module 83 in converter 82-*i*. As indicated in FIG. 5, the channel output controller 80 links or otherwise communicates the filtered message to a beeper form conversion module 81 and to a cellular phone conversion module 83. Since most beepers have a limited text string capacity the beeper form converter module preferably extracts information from the header, the source (i.e., a source identification code or address), and perhaps several lines of the body of the text to be sent as a beeper message. Additionally, other context information may also be sent. For example, an e-mail message about a family crisis may be reformated by a beeper form conversion module 81 and sent as a beeper message stating: "You have received an urgent family message from your father, the first two lines which state, 'Grandmother is in the hospital. Please call us at the hospital at (123) 456-7890.'" Similarly, voicemail form conversion module 83 extracts either part or all of the e-mail message and sends it as a voice-synthesized message. For example, in the above-described example the corresponding voicemail message sent to a cellular phone destination might be: "This is a forwarded e-mail message from your father sent via voicemail. Grandmother is in the hospital. Please call us at the hospital at (123) 456-7890."

As indicated by FIG. 5, a plurality of filters may be included in classifier 60. For example, patent agent Smith may desire that routine patent matters be handled while he is on vacation. A filter 62-*j* could be programmed to forward e-mail messages or web documents related to the ACME widget patent. The filter could, for example, use keyword and/or source filtering to filter documents related to the ACME widget patent. The patent agent may desire that this information be routinely forwarded to patent agent Jones, who is an associate at the same office. However, patent agent Smith may still desire to be occasionally updated while on vacation. Thus, he may still desire that information on the ACME widget patent is forwarded once-a-week by FAX to his hotel. As indicated in FIG. 5, the router 72-*j* forwards messages and documents related to the ACME widget patent both as an e-mail using form conversion module 87 and as a FAX form using form conversion module 85. In the case of a message forwarded by e-mail to a colleague, a forwarding header preferably is added to the message, such as a header stating, "The following is an e-mail message automatically forwarded by the message forwarding system of patent agent Smith." In the case of FAX transmission, the e-mail document needs to be converted to a picture format. Also, it is desirable that a suitable cover page and cover message is also sent. For example, the FAX cover page preferably states something to the effect that "Enclosed in an electronic message forwarded to you by your message forwarding system."

As indicated in FIG. 5, a user may also preferably program two or more filters to process information about the same types of information in different ways. For example, a filter 62-*k* may be programmed to search only for urgent messages related to the ACME widget patent. For example, patent agent Smith may set the filter criteria of filter k so that only the most urgent messages are forwarded by filter 62-*k*. Patent agent Smith may use a source filter 62-*k* to filter urgent messages from his colleague and/or the inventor regarding the ACME widget patent. A status filter 63 in filter 62-*j* may be used to filter out all but urgent messages. Filter 62-*j* preferably also uses keyword searching to filter messages related to the ACME Widget patent. Additionally, the user may also have a keyword search engine look for a code word, such as FYIA ("For Your Immediate Attention"). For example router 72-*k* may be set to immediately forward a FAX copy and to also send a voicemail message to patent agent Smith during normal waking hours (e.g., 8:00 A.M. to 10:00 P.M.) for all urgent messages related to the ACME Widget patent from colleague Jones or the inventor containing the code word FYIA. For example an urgent e-mail message from patent agent Jones to patent agent Smith, such as: "FYIA. Please return to the office by Monday. I am unable to complete the ACME widget application before the filing deadline without your assistance" is preferably forwarded as soon as possible using, for example, FAX and phone. In this example, router 72-*k* sends the message to appropriate information form conversion modules 83, 85.

This results in patent agent Smith receiving a voicemail message, such as: "You have received an urgent e-mail message from Mr. Jones, which state: 'FYIA. Please return to the office by Monday. I am unable to complete the ACME widget application before the filing deadline without your assistance.'" Additionally, patent agent Smith also receives a FAX hard copy of the same message.

Figure 6:
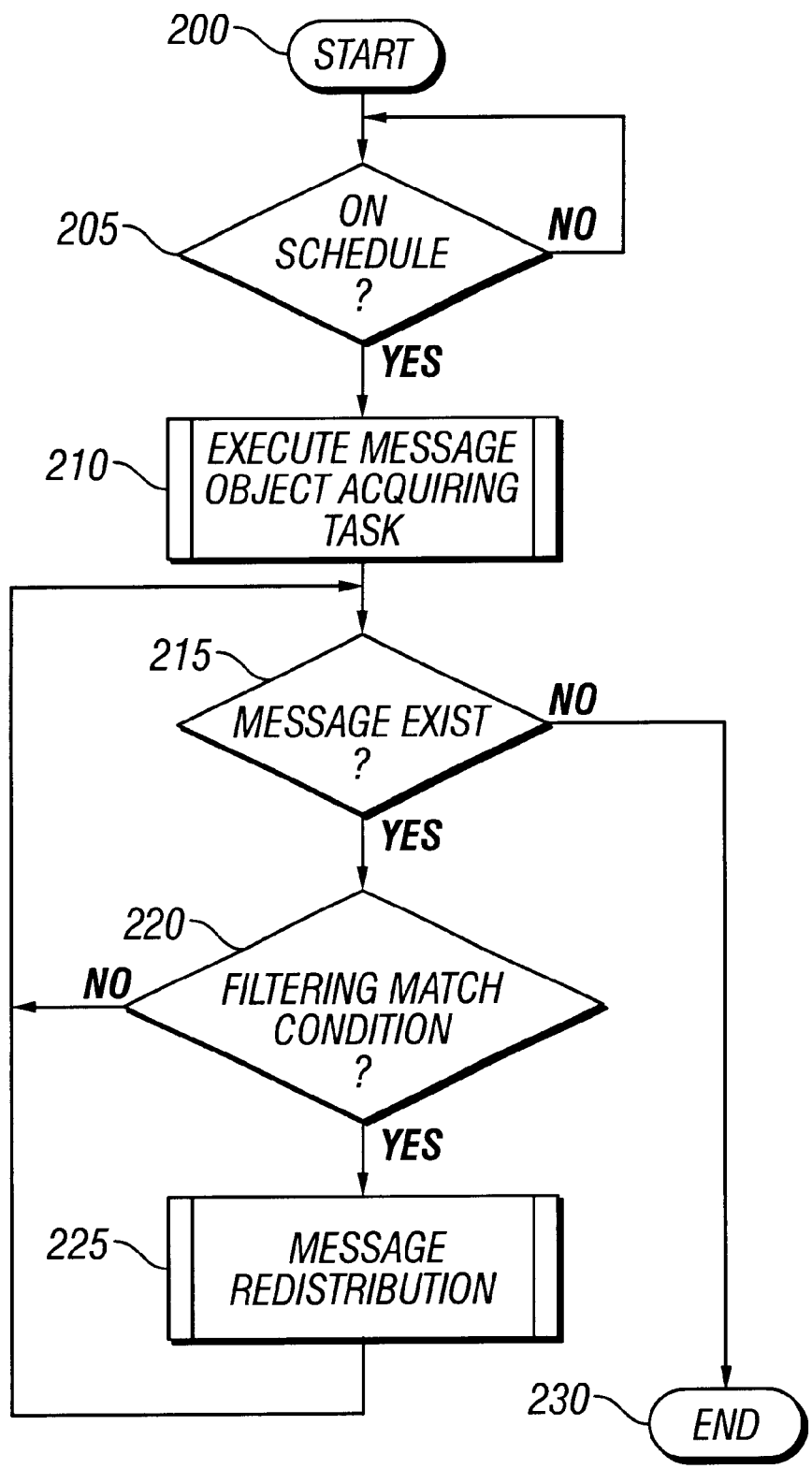
FIG. 6 is a flow chart showing a method of using the present invention with a programmable information collector.

FIG. 6 is a flow chart showing how the programmable information collector 100 interacts with the message forwarding system. The programmable information collector 100 may be set to a schedule 205. At preset times, it acquires new information from web sites 210 using a search filter 102 programmed with userdefined search terms. If the retrieved message is a new message 215, the message enters message storage 90 and is filtered 220. If the message matches the filter condition it is then redistributed 225. Preferably, the user may use different keyword filtering words and/or techniques in the programmable information collector 100.

Figure 7:
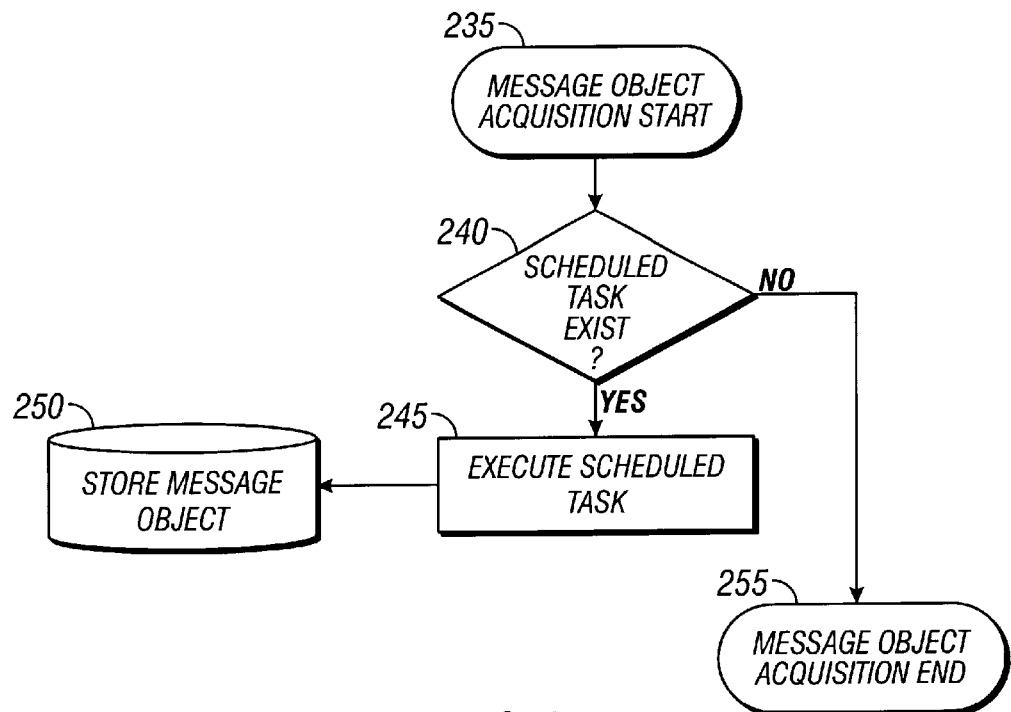
FIG. 7 is a flow chart showing the acquisition of information by a programmable information collector.

FIG. 7 is a flow chart showing some of the steps a programmable message collector may take to acquire new information. At some scheduled time 235 the process of acquisition begins. If a scheduled task 240 is preprogrammed, the task is executed 245 and the message is stored 250. Otherwise the message object acquisition continues until all of the tasks are completed 255.

Figure 8:
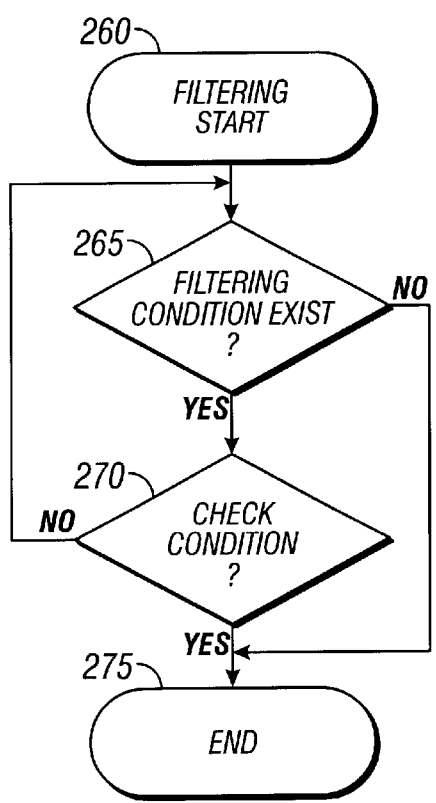
FIG. 8 is a flow chart showing the operation of a filter of the present invention.

FIG. 8 is a flow chart showing a filtering process for a filter 62. At some initial time the filtering 260 is begun. There may be one or more filtering conditions 265 that may exist. Pre-programmed filtering conditions are checked 270 prior to stopping the filter process 275 for an individual message. In the case of multiple filtering conditions it is desirable that all of the individual filtering conditions must be met in order for the filtering condition to have been satisfied. However, those of ordinary skill in the art are familiar with other filter criteria, such as a boolean "or" function.

Figure 9:
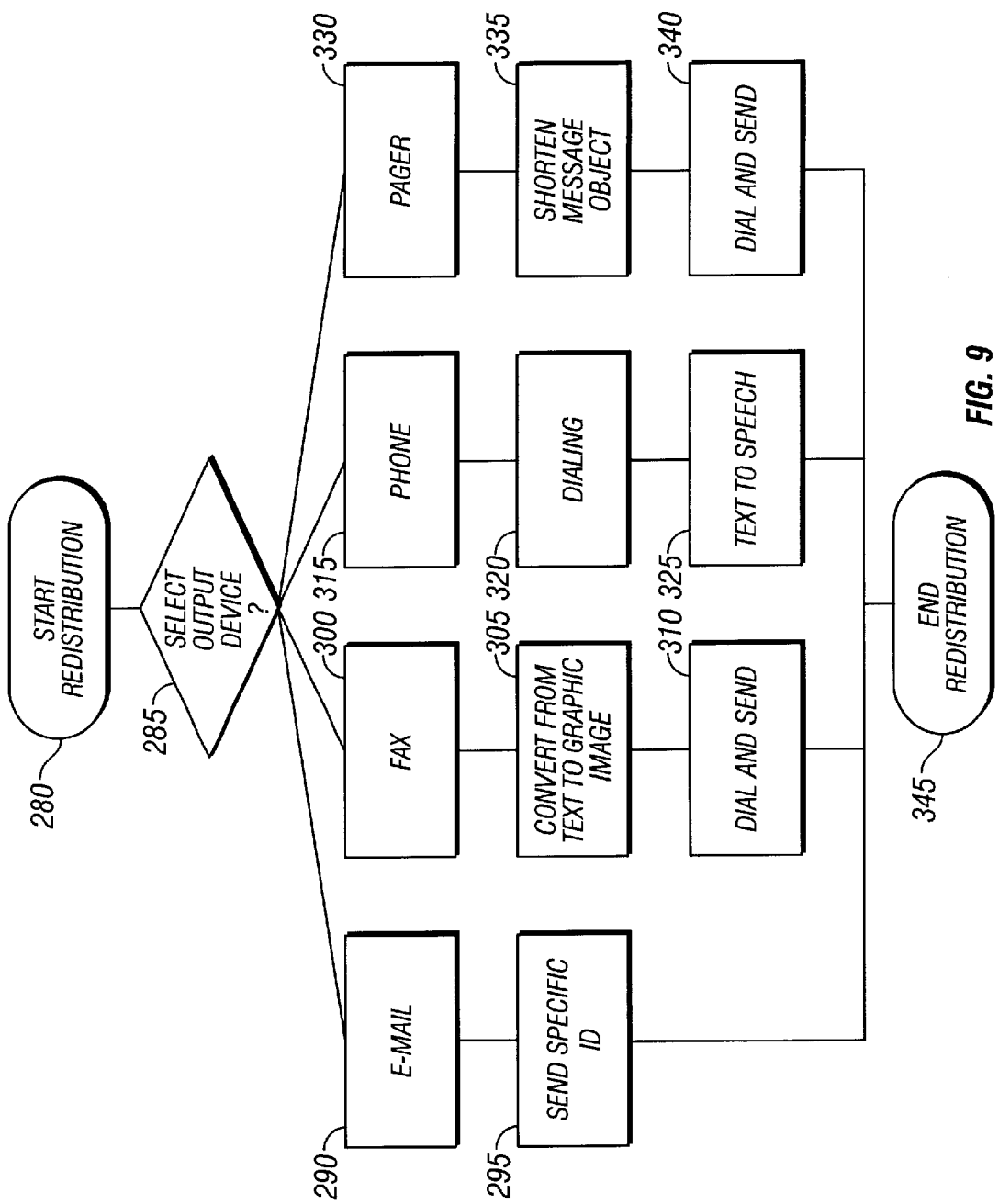
FIG. 9 is a flow chart showing the function of the converter of the present invention.
Figure 10:
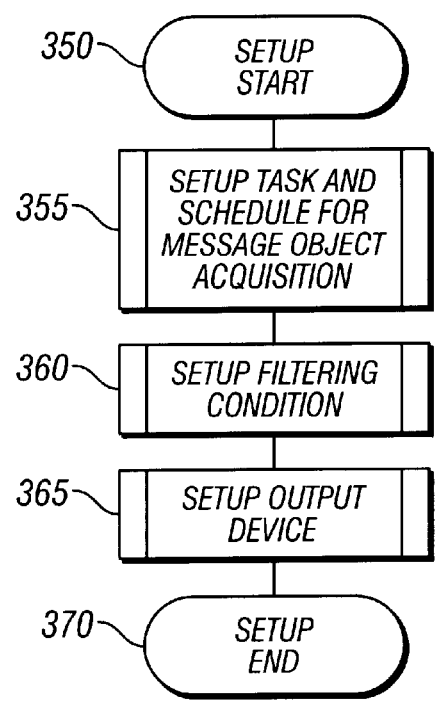
FIG. 10 is an illustrative flowchart showing a set of programming steps to set up the message forwarding system of the present invention to collect, filter, and forward data.

FIG. 9 is a block diagram chart showing how the present invention may be used to redistribute a message to a plurality of different receiving device types 290, 300, 315 and 330. At some initial time the redistribution process is initiated 280. The router and form converter perform a step 285 of selecting the appropriate output devices 290, 300, 315 and 330 for redistribution. For the case of e-mail 290 forwarding, the message is redistributed to at least one e-mail address 295. For the case of FAX redistribution 300, the text is converted to a graphic image 305 which is sent as a FAX message 310 to at least one FAX number. For the case of phone redistribution 315, the correct phone number is dialed 320 and the text message converted into speech 325 and sent to at least one phone recipient. For the case of beeper 330 redistribution, the message is shortened 335 to a length consistent with the text string capability of common beepers and is sent 340 to at least one beeper number. As shown in FIG. 9, the process is terminated when the message is redistributed 345.

FIGS. 10–14 show a preferred set of steps to program the present invention for message forwarding. At some initial time the user may desire to perform the step 350 of setting up the programmable information collector 100. The programmable information collector 100 is preferably programmed to acquire articles of interest by performing the step 355 of establishing a schedule (e.g., frequency) for which the programmable information collector 100 collects new information and/or selecting a new search criteria for the information collector 100. The user defines filter criteria by performing the step 360 of setting the filter 102 criteria for programmable collector 100. The user also programs the step 365 of setting output device information for the acquired information, such as the source of the information (e.g., world wide web or local server). The setup of the programmable information collector 100 is then terminated 370.

Figure 11:
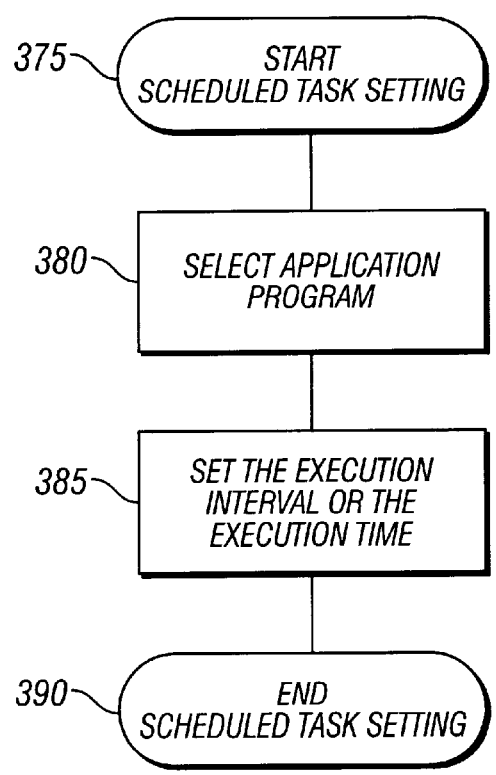
FIG. 11 is a flow chart showing steps for programming a programmable information collector to collect information according to a user-defined schedule.

FIG. 11 shows flowchart steps that may be used in programming the programmable information collector 100. The user may wish to establish a scheduled task of information acquisition 375. For example, information acquisition may be scheduled to occur once a day or perhaps several times a day. The user activates the application program 380 corresponding to the programmable information collector 100 to search the world wide web or a local server. The user then sets the execution interval or the execution time 385. Scheduled task setting 390 is then terminated.

Figure 12:
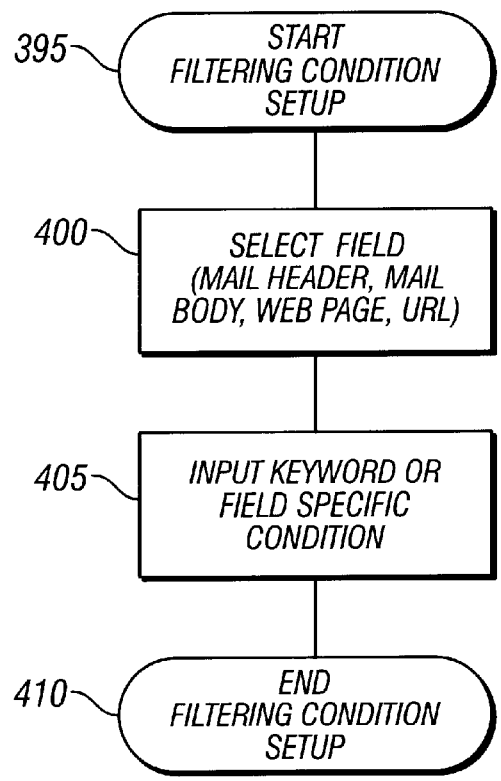
FIG. 12 is a flow chart showing how a filter of the present invention may be programmed with a plurality of filter criteria.
Figure 13:
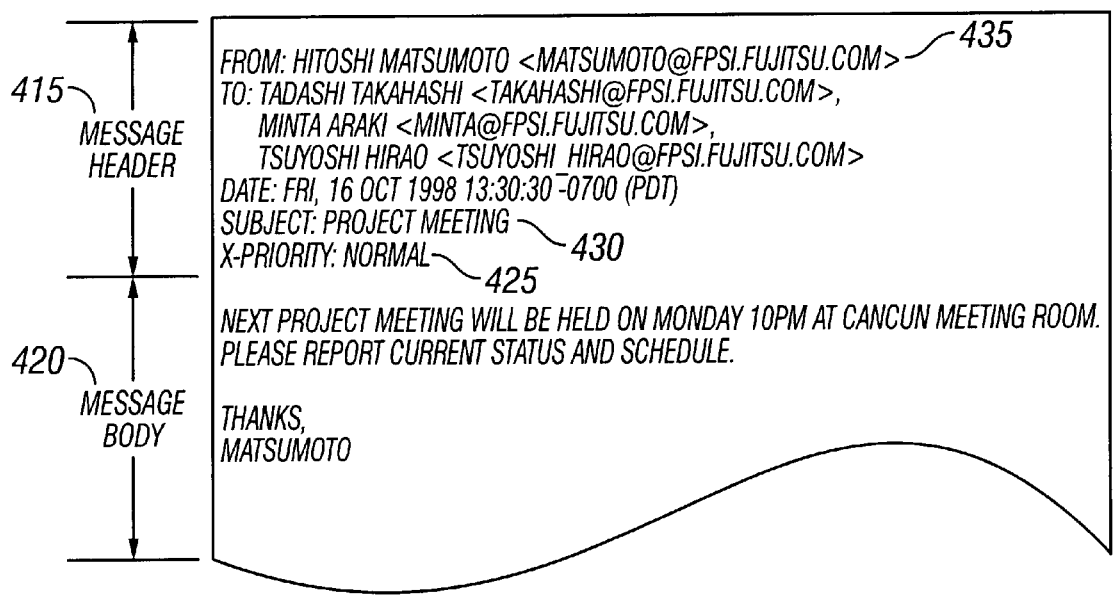
FIG. 13 is an example of an e-mail message showing different message fields.

FIG. 12 is a flowchart showing the step 395 of initiating the process of programming a filter 62. The user performs the step 400 of selecting at least one message field and the step 405 of selecting corresponding conditions for the field and/or a keyword search for that field. For example, as shown in FIG. 13, e-mail messages commonly contain information on the sender 435 as part of a message header field 415 that also includes a subject title 430 and a priority status indicia 425. There is also a message body field 420 that contains the main message. Preferably the user performs the step 405 of inputting keywords or field specific conditions related to the header field 415 and body field 420, such as keyword searching the message body. The user then ends 410 the filtering condition set up.

Figure 14:
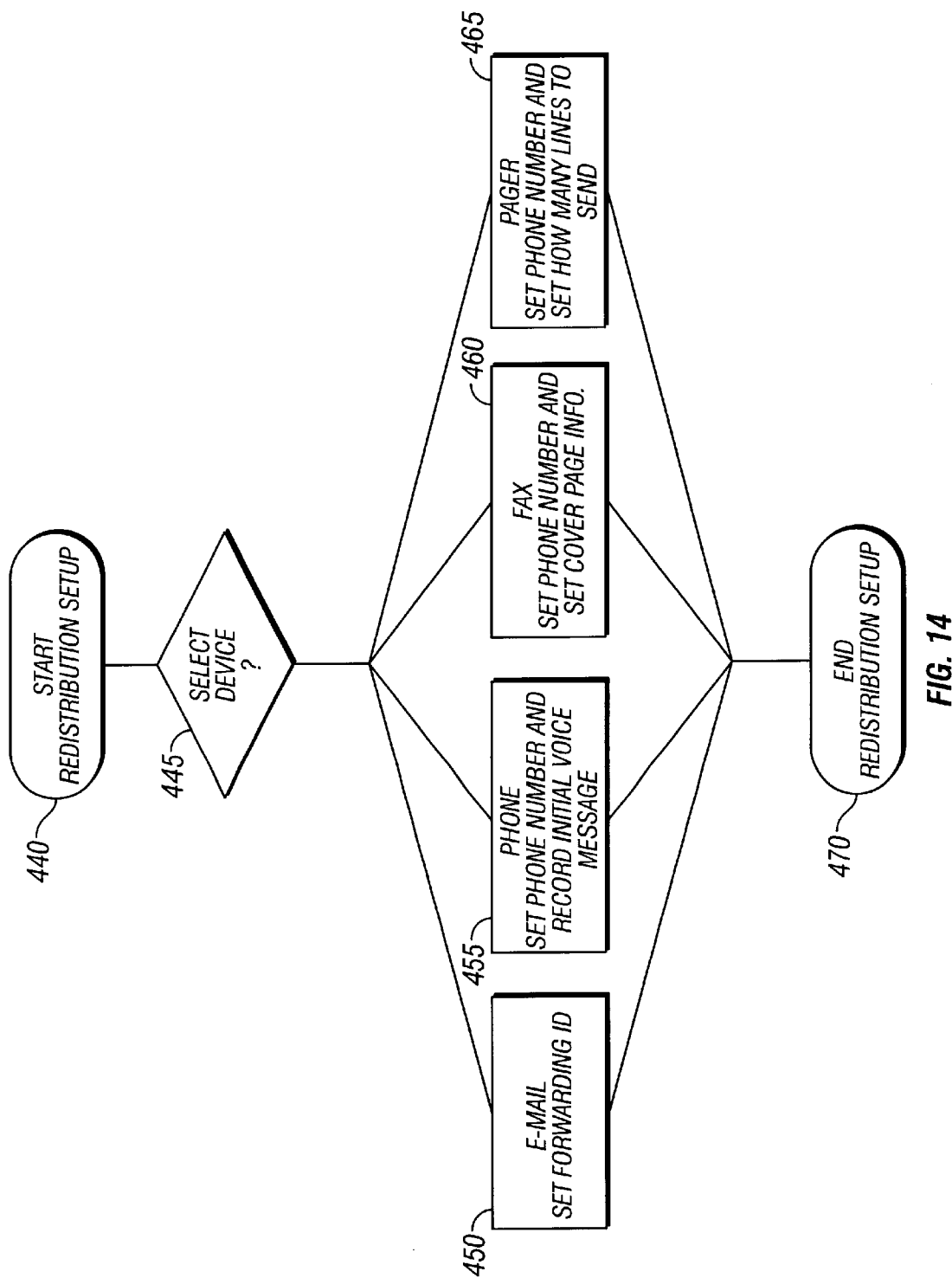
FIG. 14 is an illustrative figure showing how the user may define the device destination to which messages are forwarded.

FIG. 14 is a flowchart showing a preferred redistribution setup 440 in which the user selects the devices 445 to which information is to be forwarded. The user performs the step 450 of selecting the forwarding e-mail addresses for messages redistributed by e-mail. For the case of phone redistribution the user performs the step 455 of setting the phone number and preferably may also record an introductory statement for a message sent to themselves, such as: "The following is a forwarded electronic message sent by your message redistribution system" or a custom message for others, such as "John, while I am away from the office I am forwarding urgent electronic messages to you regarding ACME, Inc., by voice-mail. The following is a voice-synthesized version of an important electronic message for you to handle in my absence." As shown in FIG. 14, the user preferably may perform a step 460 of setting both the FAX phone number and cover page information. For example, a user may desire that information regarding the ACME patent sent as a FAX have a cover page stating: "Enclosed is a FAX message regarding the ACME patent." For the case of redistribution by pager, it is desirable that the user performs the step 465 of setting the phone number, entering a brief introductory message, and also select how many lines of the message to send in accordance with the capability of their pager. As indicated by step 470, redistribution setup may be terminated after setting up one filter/router. However, more generally a plurality of filters/routers may be individually programmed according to the teachings of the present invention in order to achieve a desired forwarding function.

Although a preferred embodiment of the present invention and modifications thereof have been described in detail herein, it is to be understood that this invention is not limited to those precise embodiments and modifications, and that other modifications and variations may be affected by one of ordinary skill in the art without departing from the spirit and scope of the invention as defined in the appended claims.

What is claimed is:

1. An information forwarding system for automatically forwarding electronic messages to a plurality of destinations, comprising:

a program command module to enter user-defined criteria for selecting and forwarding messages to said plurality of destinations;

a classifier, said classifier including a plurality of filters that may be programmed using said user-defined criteria to select information to be forwarded;

a channel selector module having a plurality of routers, said plurality of routers including one router linked to the output of one said filter of said classifier, each said router containing forwarding information for a corresponding filter; and a channel output controller having a plurality of form converters, one form converter of said channel output linked to one corresponding said router of said channel selector module;

wherein each said form converter of said channel output controller converts filtered messages from one filter routed by one router into a form suitable for the destination to which the filtered message is to be forwarded to.

2. The information forwarding system of claim 1, wherein each said filter is configurable and includes user definable criteria based upon the source of the information.

3. The information forwarding system of claim 2, wherein each said filter further comprises a keyword search engine utilizing user-input keywords to filter messages.

4. The information forwarding system of claim 3, wherein one message may be forwarded to a plurality of different destinations and the information is converted into a form appropriate for each receiving device type.

5. The information forwarding system of claim 4, wherein the information is forwarded according to a time schedule defined by the user.

6. The information forwarding system of claim 2, wherein each said filter utilizes a user profile to filter information.

7. The information forwarding system of claim 1, further comprising a programmable information collector to collect information from the world wide web and send said information as a message to said computer.

8. The information forwarding system of claim 7, wherein said programmable information collector is a news clipping program.

9. The information forwarding system of claim 8, wherein the user may set the frequency at which articles are clipped from a plurality of user-defined web-sites.

10. The information forwarding system of claim 1, wherein said destinations include an e-mail address, a pager, a facsimile machine, and a telephone.

11. The information forwarding system of claim 10, wherein the information is forwarded according to a time schedule defined by the user.

12. An information forwarding system for automatically forwarding electronic messages and data to a plurality of destinations, comprising:

a filter configured to select input messages to be forwarded based upon a user defined filter criteria;

a router that may be programmed with forwarding information to determine the destination of the forwarded messages, said router receiving filtered messages from said filter; and a form converter linked to said router;

wherein said form converter converts filtered messages routed to said form converter into a form suitable for the destination to which the message is to be forwarded to.

13. The information forwarding system of claim 12, wherein said destinations include an e-mail address, a pager, a facsimile machine, and a telephone.

14. The information forwarding system of claim 13, wherein said filter includes a keyword search engine.

15. The information forwarding system of claim 14, further comprising a programmable information collector to acquire information from the world wide web to be processed as electronic messages.

16. The information forwarding system of claim 12, further comprising a plurality of filters, router, and form converters, wherein each output of each said filter is linked by a corresponding router to a corresponding form converter.

17. The information forwarding system of claim 16, wherein each said information form converter includes means to link routed messages to information form conversion modules.

18. The information forwarding system of claim 17, wherein each router has subrouters to link filtered messages to an appropriate form conversion module.

19. An information forwarding system for automatically forwarding electronic messages to e-mail address destinations and non e-mail destinations, comprising:

programmable filter means using user-defined criteria to select messages to be forwarded;

programmable router means to route filtered messages; and converter means to convert said filtered messages into a format suitable for the intended forwarding device.

20. The information forwarding system of claim 19, further comprising:

programmable message collector means for collecting articles from the world wide web that are to be forwarded.

21. A method of forwarding electronic messages received by a computer from a server, comprising the steps of:

a) providing a message forwarding system comprising user definable filters to classify the incoming messages, where filtered messages from each filter are routed by a router to a form converter that converts the incoming message into a form suitable for transmission according to the receiving device type to which the message is being forwarded;

b) inputting filter criteria for each said filter, said filter criteria including source indicia and keywords; and c) inputting forwarding information for each said router, said forwarding information including forwarding addresses(es), receiving device type(s), and time intervals during which information is to be forwarded.

22. The method of forwarding electronic messages of claim 21, wherein the method further comprises the steps of:

d) providing a programmable information collector for acquiring information from a local server or the world web and sending said information to said computer as an incoming message;

e) inputting keywords and access times for said programmable information collector to search a server for articles of interest.

* * * * *